United States Patent [19]
Ellis

[11] Patent Number: 5,509,639
[45] Date of Patent: Apr. 23, 1996

[54] WINCH ASSEMBLIES

[76] Inventor: Craig A. Ellis, 11402 Nora Dr., Fenton, Mich. 48430

[21] Appl. No.: 132,041

[22] Filed: Oct. 5, 1993

[51] Int. Cl.$^6$ .............................. B66D 3/00; B66D 1/00; B60R 9/00; B65F 1/00
[52] U.S. Cl. ........................ 254/380; 254/323; 444/538; 224/517
[58] Field of Search ........................ 254/323, 325, 254/380, 266, 376; 414/563, 538, 537, 571, 480, 494, 462, 559; 224/42, 32, 517

[56] References Cited

U.S. PATENT DOCUMENTS

| | | |
|---|---|---|
| 1,451,127 | 4/1923 | Thornton . |
| 2,072,398 | 3/1937 | Faulk ........................... 254/380 X |
| 2,258,396 | 10/1941 | LeTourneau . |
| 2,339,900 | 1/1944 | Wright et al. . |
| 2,409,398 | 10/1946 | Shoemaker . |
| 2,547,601 | 4/1951 | Scheirer . |
| 2,604,302 | 7/1952 | Francis ........................ 254/325 X |
| 2,701,670 | 2/1955 | Hutchinson ..................... 224/42.32 |
| 3,210,049 | 10/1965 | Holsclaw ....................... 254/323 |
| 3,797,681 | 3/1974 | Brettrager ..................... 414/559 |
| 3,819,074 | 6/1974 | Oliver ......................... 414/462 |
| 3,843,002 | 10/1974 | Pihlgren ....................... 414/538 X |
| 4,044,907 | 8/1977 | Craft . |
| 4,212,580 | 7/1980 | Fluck . |
| 4,269,396 | 5/1981 | Easterwood .................... 254/325 |
| 4,274,788 | 6/1981 | Sutton . |
| 4,368,002 | 1/1983 | Kryzosiak, Jr. . |
| 4,979,865 | 12/1990 | Strickland . |
| 5,176,365 | 1/1993 | Best ........................... 254/266 X |
| 5,186,410 | 2/1993 | Toews .......................... 254/323 X |
| 5,249,910 | 10/1993 | Ball ........................... 414/538 |

Primary Examiner—Daniel P. Stodola
Assistant Examiner—Michael R. Mansen
Attorney, Agent, or Firm—Harness, Dickey & Pierce

[57] ABSTRACT

Selectively attachable winch assemblies wherein a first embodiment includes a bracket having a base plate, a stanchion extending upwardly from the base plate including structure for supporting a winch in an elevated free standing position and a backing plate which preferably is permanently attached to the vehicle and includes structure for securing the bracket. During periods of nonuse, the winch assembly is removable from the vehicle to free up space for other purposes. Under another embodiment of the present invention the winch is selectively adjustable along various points on the supporting substrate.

9 Claims, 6 Drawing Sheets

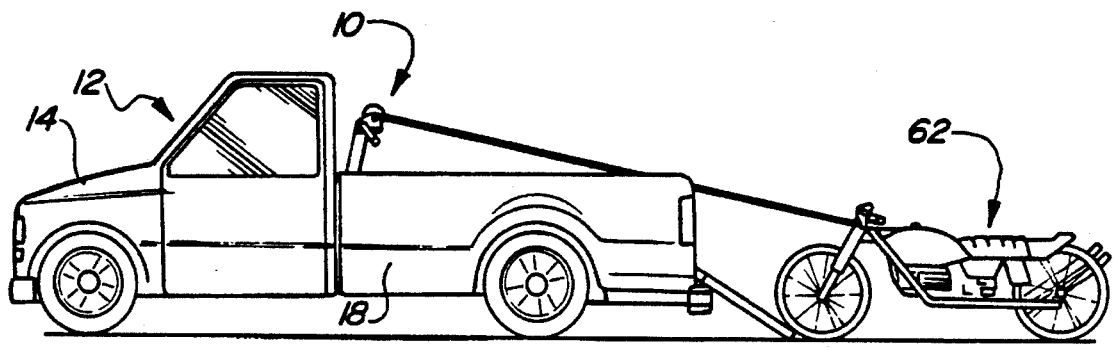
Fig-1
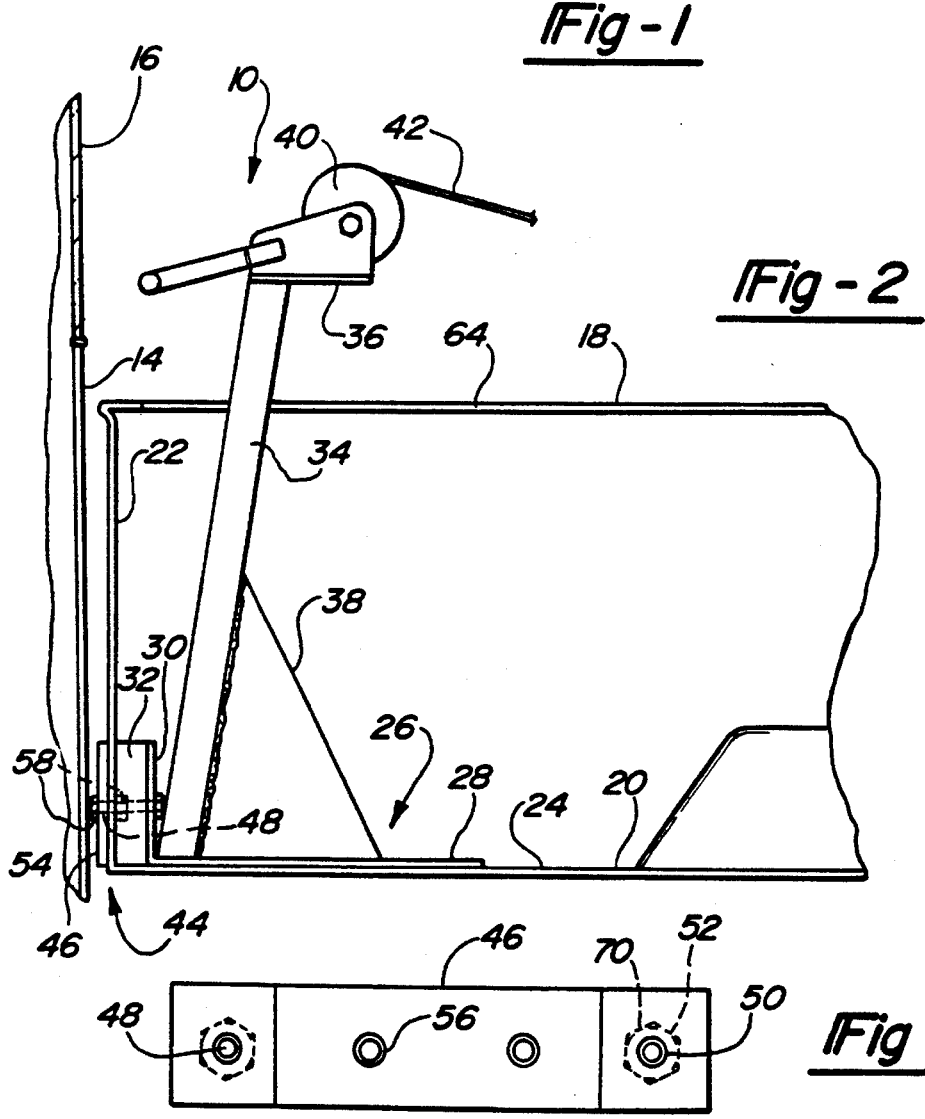
Fig-2
Fig-3

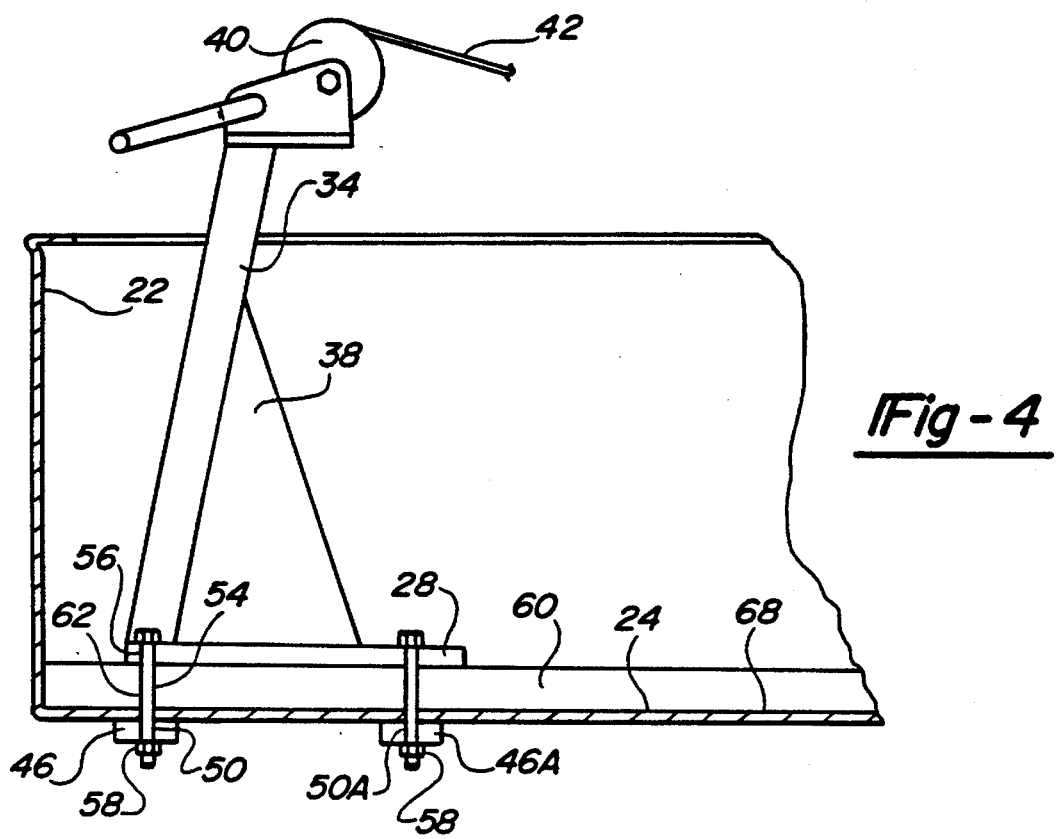
*Fig-4*
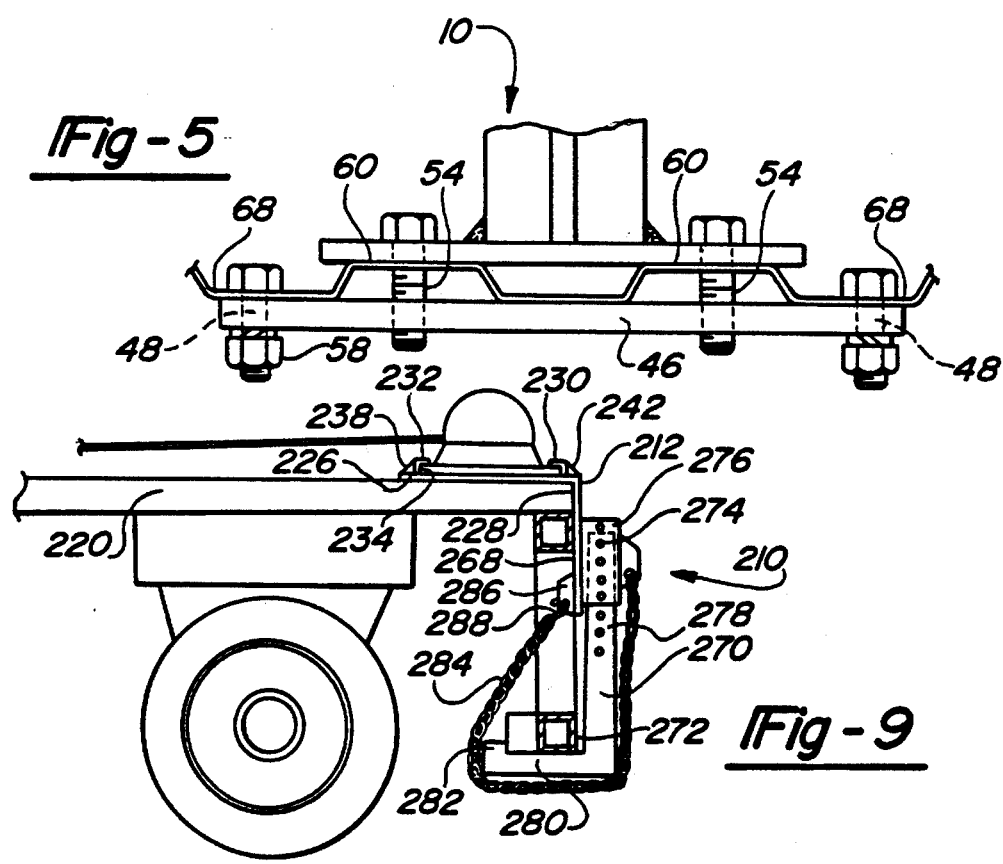
*Fig-5*
*Fig-9*

WINCH ASSEMBLIES

BACKGROUND OF THE INVENTION

I. Field of the Invention

The present invention relates generally to winch assemblies, and more particularly to a winch assemblies which are selectively attachable and detachable to various substrates.

II. Discussion

The winch assemblies described herein are particularly useful for loading or moving heavy or excessively large objects, including but not limited to, recreational vehicles such as motorcycles, all-terrain vehicles and bicycles. Heretofore, devices for loading or moving heavy or excessively large objects tended to be unnecessarily bulky. Further, such winch-like assemblies tended to be permanently attached to the supporting surface. For example, U.S. Pat. No. 4,274,788 which issued Jun. 23, 1981 to Sutton discloses a vehicle mounting carriage and elevating apparatus which includes a large support frame secured to a vehicle. The apparatus includes a link frame pivotally secured to a support frame and a post frame which is pivotally secured to the vehicle itself. An actuation apparatus is secured between the support frame and the carriage which is adapted to move the carriage from a lower inclined position extending rearwardly of the vehicle to a substantially horizontal elevated position. While apparently effective, a considerable amount of time and energy can be expended simply attaching and detaching the carriage and elevating apparatus to and from the truck bed. Further, once attached a large number of manipulations of the apparatus are required to lift the recreational vehicle into and out of the truck bed.

Yet another problem with many winch assemblies is that they are merely intended for assisting in drawing an entire supporting device which includes a previously loaded object onto the support surface rather than directly drawing the object onto the support surface. U.S. Pat. No. 4,212,580 which issued Jul. 15, 1980 to Fluck discloses such a device including a supporting cradle for withdrawing and launching a boat into and from a body of water. The winch assembly of the boat launching apparatus is directly mounted to the frame of a truck bed adjacent the rear wall of the truck bed cab. The winch is activated to first pull the boat onto the supporting cradle and thereafter pull the supporting cradle with the boat mounted thereon, into the truck bed.

Still other winch assemblies which are used in association with pickup truck beds have the disadvantage of being permanently attached to the truck bed. Often this presents problems in that the entire truck bed may subsequently be needed for purposes other than transporting recreational vehicles.

In contrast to many of the known apparatuses an object of the present invention is to provide selectively attachable and detachable winch assemblies which can be used to load and/or move various objects onto and over the desired surface. For example, the winch assemblies are particularly useful for loading and/or moving recreational vehicles including but not limited to, motorcycles, all-terrain vehicles and bicycles onto or off from a truck bed without requiring additional supporting apparatuses to carry out the loading and unloading step.

Yet another object of the present invention is to provide at least one winch assembly which extends above the supporting surface to generate sufficient leverage for loading and unloading various objects and which provides clearance for the drawing cable, strap or chain.

Still another object of the present invention is to provide at least one winch assembly which extends above the supporting substrate and is positioned such that the handle of the winch can be free cranked without interference.

Yet another object of the present invention is to provide at least one winch assembly which is selectively positionable at various points relative to the supporting surface.

To achieve the foregoing objects a first winch assembly embodiment according to the teachings of the present invention includes a bracket having a base plate which is positioned adjacent the supporting substrate and a stanchion extending from the base plate including a supporting plate for hosting the winch. Extending between the base plate and the stanchion is a gusset for supporting the stanchion which preferably extends from the base plate at an oblique angle sufficiently above the support surface to provide clearance for the drawing cable. To attach the base plate to the supporting substrate a backing plate is provided which is permanently mounted to the under surface of the supporting substrate. Additionally, a spacer may be provided between the base plate and a portion of the supporting substrate to insure sufficient spacing of the winch assembly.

Under another winch assembly embodiment according to the teachings of the present invention the winch assembly includes a bracket having an L-shaped base plate which is positioned on the supporting substrate. The base plate includes a pair of upwardly extending legs having incurved flanges which provide a channel. The winch is integrally attached to a guide plate which is secured within the channel. By adjusting the position of the guide plate within the channel the winch can be positioned at various locations relative to the supporting substrate.

BRIEF DESCRIPTION OF THE DRAWINGS

Additional benefits and advantages of the present invention will become apparent from reading the description of preferred embodiments and referring to the specific examples and accompanying drawings, in which:

FIG. 1 is a side elevational view of a winch assembly according to the teachings of the present invention attached to a truck bed and shown loading a recreational vehicle into the truck bed;

FIG. 2 is an enlarged sectional view of the forward end of the truck bed including a preferred winch assembly embodiment according to the teachings of the present invention;

FIG. 3 is a frontal view of the backing plate used in association with various winch assembly embodiments according to the teachings of the present invention;

FIG. 4 is a enlarged side elevational view of an alternative preferred embodiment according to the teachings of the present invention;

FIG. 5 is a frontal view illustrating a structure for mounting the winch assembly of FIG. 4 to a substrate; that of FIGS. 6 and 7 illustrating an alternative structure for mounting the winch assembly to a substrate.

FIG. 9 is a side elevational view of an alternative preferred embodiment according to the teachings of the present invention mounted to a flat bed truck;

DETAILED DESCRIPTION OF THE PREFERRED EMBODIMENT

Figure 6:
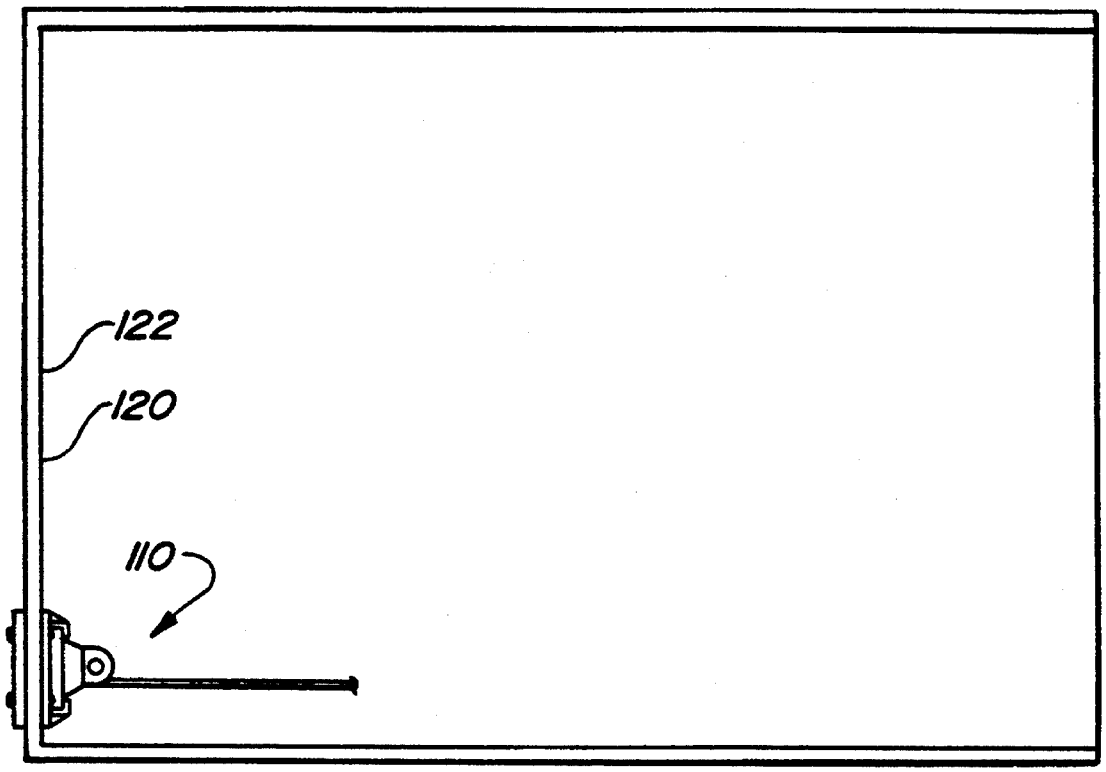

Referring to FIG. 1, a winch assembly 10 according to the teachings of the present invention is shown mounted to a pickup truck 12 within the truck bed 18. As noted, the winch assembly is particularly useful for loading and unloading objects such as recreational vehicles 62 such as motorcycles, all-terrain vehicles, bicycles and the like, into and out of the truck bed. While the present invention is described for exemplary purposes as being used in association with pickup trucks it should be understood by those skilled in the art that the winch assembly can be used with other vehicles such as trailers, semi-trucks, flat bed trucks and stake trucks to name a few, as well as being mounted to various supporting substrates such as loading docks and the like.

Referring to FIGS. 2 and 4, first and second alternative preferred embodiments of the present invention are shown in more detail. With particular reference to FIG. 2 a first embodiment is demonstrated as being mounted to a pickup truck along the forward wall 22 of the truck bed 18. The assembly includes a bracket 26 which has an overall L-shape in cross-section. The bracket includes a base plate 28 which rests upon the supporting substrate 20, which is shown here as a truck bed floor 24, and a blocking member 30 which extends upwardly from the base plate 28 substantially perpendicular to the truck bed floor. Under this embodiment the base plate 28 is positioned upon the truck bed floor in proximity to the forward end of the truck bed 18 such that the blocking member 30 is spaced slightly away from the forward wall 22 of the truck bed. While the preferred embodiment includes a blocking member 30 in the form of a plate it should be noted by those skilled in the art that posts or bars could also extend from the base plate and serve the same function as the blocking plate.

Extending from the base plate 28 near the junction of the base plate 28 and blocking member 30 is a stanchion 34 which preferably extends above the top edge 64 of the truck bed. The stanchion can extend substantially vertically or at an oblique angle from the base plate depending on the user's needs. Integrally attached to the stanchion 34 along the upper end is a support plate 36 for hosting a winch assembly 40. A gusset 38 which extends between the stanchion 34 and the base plate 28 is provided to maintain the structural integrity of the winch assembly while force is exerted on it during periods of use. The gusset which can be in a number of forms such as a bar or the substantially triangular piece shown may be welded, or otherwise mechanically or adhesively attached between the stanchion and the base plate.

According to the present invention any suitable commercially available winch 40 having a cable 42 or other means for drawing the object into the truck bed can be used. It should be understood by those skilled in the art while a manually operated winch 40 is shown it is contemplated that a mechanically or hydraulically driven winch can be utilized under the present invention.

To secure the bracket 26 such that the base plate 28 is held contiguously against the floor 24 of the truck bed 18, a backing plate 46 including means 44 for attaching the winch assembly 10 to the truck bed 18 is provided. The backing plate 46 which may have any suitable overall shape including a rectangular configuration as shown in FIG. 3 is provided with a plurality of apertures 50, as shown more clearly in FIG. 3, through which carriage bolts 48 extend. The carriage bolts 48 project through the forward wall 22 of the truck bed 18 and the backing plate 46 such that nuts 52 can be tightened thereover to secure the backing plate to the forward wall 22. Generally, the backing plate is intended to be permanently attached to the truck bed.

Welded or otherwise permanently attached to the backing plate 46 are a plurality of positioning bolts 54 which can extend in the same direction or the opposite direction of the carriage bolts depending mainly on the supporting substrate 20 to which they are to be secured. These positioning bolts 54 are sufficiently long to allow for attachment of a spacer 32 to be positioned between the forward wall 22 and the blocking member 30. While the spacer 32 is an optional attachment, preferably it is included under this embodiment as it serves to insure that the winch 40 is maintained a sufficient distance from the rear window 16 of the truck cab 14.

To assemble the winch assembly 10 to the truck bed 18 the spacer is positioned contiguously against the forward wall 22 of the truck bed such that the positioning bolts 54 extend through slots 56 provided on the backing plate 46, beyond the spacer 32 and through the blocking member 30. Nuts 58 are thereafter secured over the ends of the positioning bolts to lock the winch assembly 10 in place. Once the winch assembly 10 has thus been secured in place, the winch 40 may be operated. The unique structure of the winch assembly 10 causes the forces generated during operation of the winch 40 to be directed to the floor.

Referring now to the embodiment shown with reference to FIG. 4 a slight variation is provided. As the embodiment demonstrated in FIG. 4 is substantially similar on an element by element basis to the embodiment of FIG. 2 like reference numerals will hereinafter be used for like elements. According to this embodiment the blocking member 30, the spacer 32 and the carriage bolts 48 as shown in FIG. 2 have been eliminated. A pair of backing plates 46 and 46A are now mounted to the underside of the truck bed floor 24 in a manner similar to that described with reference to FIG. 2. The base plate 28 of the assembly 10 is positioned over the truck bed floor 24 such that the slots 56 are in alignment with the holes 62 provided in the truck bed floor. the positioning bolts 54 are then fed through slots 56 and through the holes 62 such that the bolt extends below the floor. The backing plates 46 and 46A are then positioned over the bolts so that the bolts extend through the apertures 50 and 50A provided on the respective backing plates. Again, nuts 58 are tightened over the bolts 54 to contiguously position the backing plates 46 and 46A against the underside of the truck bed floor to secure the winch assembly in place. Under the embodiment of FIG. 4 it should be noted that the base plate 28 is shown as being attached over risers 60 which are commonly provided along the truck bed floor 24 for water drainage purposes. It should be understood by those skilled in the art that the risers 60 as shown in FIG. 4 may or may not be present depending upon the make and model of the vehicle.

It should be clear to those skilled in the art that the dual backing plates of this embodiment are intended for space savings. It is contemplated that a single backing plate as shown in FIG. 5 could also be utilized if desired. Additionally, it should be recognized that the positioning bolts could be fed through from under the truck floor and the nuts attached over the base plate.

According to the alternative structure of FIG. 5 the winch assembly 10 is attached such that a single backing plate 46 extends across a plurality of risers 60. Under this arrangement carriage bolts 48 which are again provided extend through two different recessed portions 68 and the positioning bolts 54 extend through two different risers 60.

It should be clear to those skilled in the art that the winch assembly 10 can be readily attached and detached from the desired supporting substrate. To detach the assemblies shown in FIGS. 1 though 5 the nuts 58 are unscrewed and removed and the bracket 26 is pulled away from the supporting substrate. Depending mainly upon the user's needs the backing plate 46 and bolts 48 and 54, respectively, can remain attached to the supporting substrate upon removal of the rest of the winch assembly.

Figure 7:
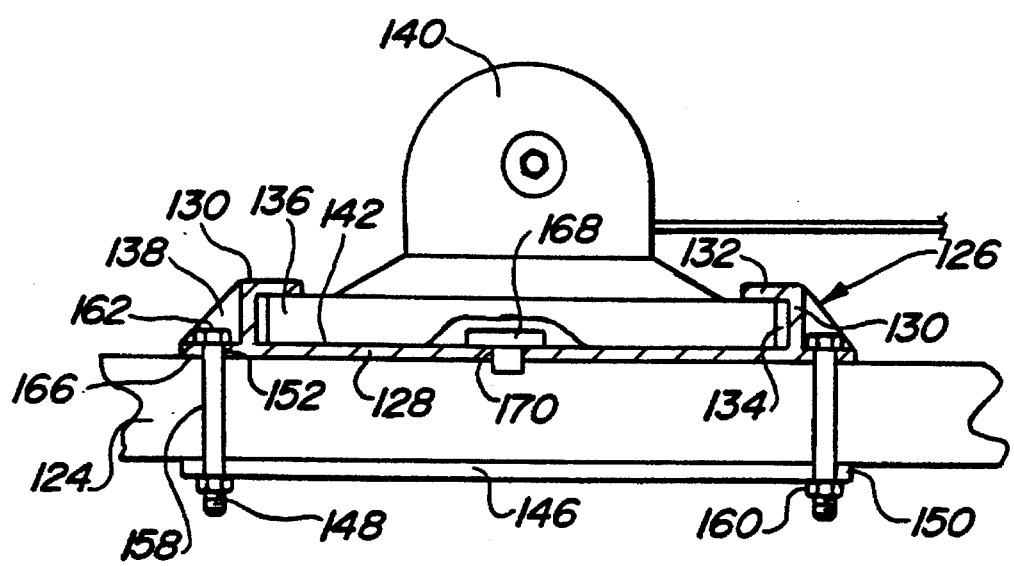

Turning now to FIGS. 6 and 7 side elevational views of an alternative preferred winch assembly embodiment according to the teachings of the present invention is provided. The winch assembly 110 is demonstrated as being mounted to a supporting substrate 120 such as a vertically extending wall 122 as shown in FIG. 6 or to a truck bed floor 124 as shown in FIG. 7. The assembly 110 generally includes a bracket 126 which is mounted to the supporting substrate 120 and a winch assembly 140. The bracket 126 includes a base plate 128 and a pair of legs 130 projecting from a top surface 142 of the base plate. Typically, the legs 130 are provided with flanged ends 132 which extend towards each other thus forming a channel 134. Optionally, but often preferably gussets 138 which extend between the base plate 128 and the projecting legs 130 are provided to enhance the structural integrity of the bracket 126.

The winch 140 which again can be selected from various suitable commercially available mechanisms is mounted to an elongated guide plate 136 which is generally planar and rectangular in shape. The guide plate 136 is slightly narrower than the space located between the projecting legs 130 but sufficiently wide so as to be retained within the channel 134 by the flanged ends 132 of the legs 130.

To mount the winch assembly 110 to the desired substrate 120 the guide plate 136 is slid into the channel 134. Carriage bolts 148 are then fed through apertures 152 contained on the base plate 128 and apertures 158 which extend through the supporting substrate 120. Once the bracket 126 is positioned on the supporting substrate 120 the backing plate 146 is positioned over the carriage bolts 148 such that the bolts 148 extend through apertures 150 contained on the backing plate 146. Nuts 160 are then attached to the bolts to secure the winch assembly 110 to the supporting substrate 120. The guide plate 136 can thus be slid to various points within the channel 134 to position the winch 140 in the desired location. The bolts 148 can be positioned such that the heads 162 of the carriage bolts 148 can either extend into the channel 134 to serve as stop means for precluding undesired lateral movement of the guide plate 136 or can be counter sunk below the top surface 142. Preferably, however, the carriage bolts 148 are disposed along the edges 166 of the bracket 126. To provide stop means for precluding undesired lateral movement of the guide plate 136 selectively removable pins 168 can be inserted into apertures 170 extending through the base plate 128 within the channel 134.

Figure 8:
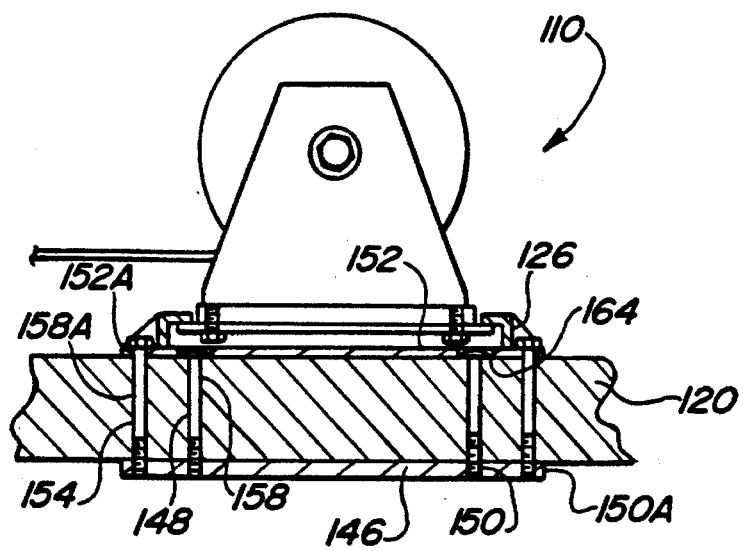

Referring to FIG. 8, the alternative embodiment demonstrated is a subtle variation of the embodiment shown in FIGS. 6 and 7. Since the embodiment of FIG. 8 is substantially similar to that of FIGS. 6 or 7, like reference numerals are used for like elements. According to this embodiment both carriage bolts 148 and positioning bolts 154 are utilized to secure the bracket 126 to the supporting substrate 120. The carriage bolts 148 are fed through apertures 152 contained on the bracket 126, apertures 158 which extend through the supporting substrate 120 and apertures 150 contained on the backing plate 146. Preferably, washers 164 are used with the carriage bolts 148. Positioning bolts 154 are also utilized to secure the winch assembly 110 to the supporting substrate 120. The positioning bolts also extend through apertures 152A contained on the bracket 126, apertures 158A which extend through the supporting substrate 120 and slots 150A provided on the backing plate 146. Again, the winch assembly 110 can be moved laterally within the channel 134 by sliding the guide plate 136 to the desired position. As will be recognized by those skilled in the art the embodiments of FIG. 6, 7 and 8 would allow the user to remove the winch 140 by sliding the guide plate 136 out of the channel 134. Thus, the winch 140 could be transferred from vehicle to vehicle merely by providing each vehicle with brackets 126 having a similarly sized channel 134.

Referring to FIG. 9, an alternative winch assembly embodiment which is particularly useful for flat bed trucks and loading platforms is provided. The winch assembly 210 includes a bracket 226 having an L-shaped base plate 228. Extending from the top surface 242 are a pair of spaced apart legs 230 having flanged ends 232 which extend toward each other to provide the channel 234. Hereto, gussets 238 may be provided to give the bracket 226 structural integrity.

The second leg 268 of the base plate 228 extends downwardly from the first leg 266 in a direction opposite of the top surface 242. As shown in FIG. 9 the first and second legs are generally positioned substantially contiguously against a corner 212 of the supporting substrate 220.

Coupled to the second leg 268 is a selectively adjustable L-shaped member 270 for engaging an extending portion such as a wall or cross-bar 272 as shown in FIG. 9. The height of L-shaped member 270 can be varied depending upon the needs of the user. By removing a blocking pin 274 which extends through the first leg 278 of the L-shaped member 270 and the joint 276 the L-shaped member can be adjusted up or down. Once the desired position has been determined the L-shaped member can be locked in position by reinserting the blocking pin 274 to extend through the L-shaped member 270 and the joint 276. Optionally, the second leg 280 of the L-shaped member can be provided with a flanged end 282 which locks under the cross-bar 272.

Preferably a safety chain, cable or rope is provided and attached along one end to the joint 276 and a hook 288 or other latching mechanism is disposed along the other end. The chain 284 is wrapped around the L-shaped member 270 and cross-bar 272 to further secure the winch assembly 210 to the supporting substrate 220. The chain 284 is then attached via the hook 288 to a rib 286 which extends from the base plate 228 or is attached to another part of the chain.

Figure 10:
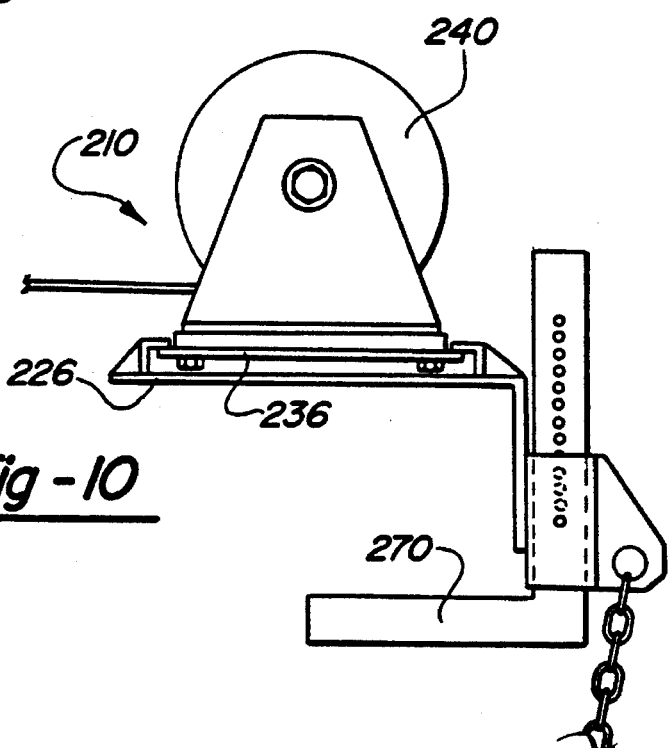
FIG. 10 is a side elevational view of an alternative preferred winch assembly embodiment according to the teachings of the present invention.
Figure 11:
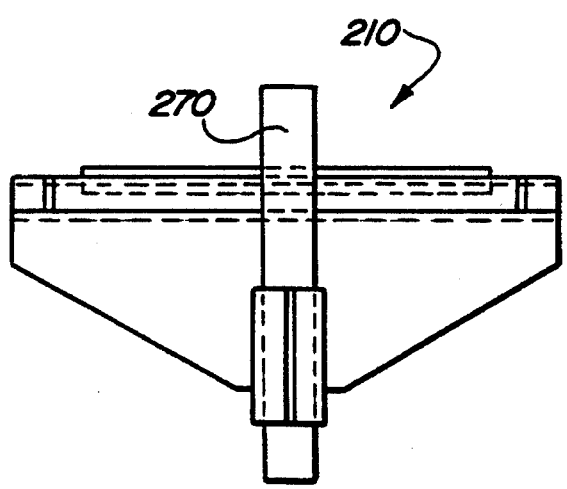
FIG. 11 is a top view of the winch assembly of FIG. 10.

Referring to FIGS. 10 and 11, the winch assembly 210 is shown with the L-shaped member 270 being fully retracted. Essentially, the only difference between this embodiment and that of FIG. 9 is that the winch 240 is mechanically fastened to the guide plate 236 rather than being welded or otherwise integrally attached. Under the embodiments demonstrated in FIGS. 9, 10 and 11, generally the bracket 226 is not mechanically fastened to the substrate by carriage and positioning bolts. It should be apparent, however, to one skilled in the art that mechanical fastening means could be alternatively provided as previously taught.

Figure 12:
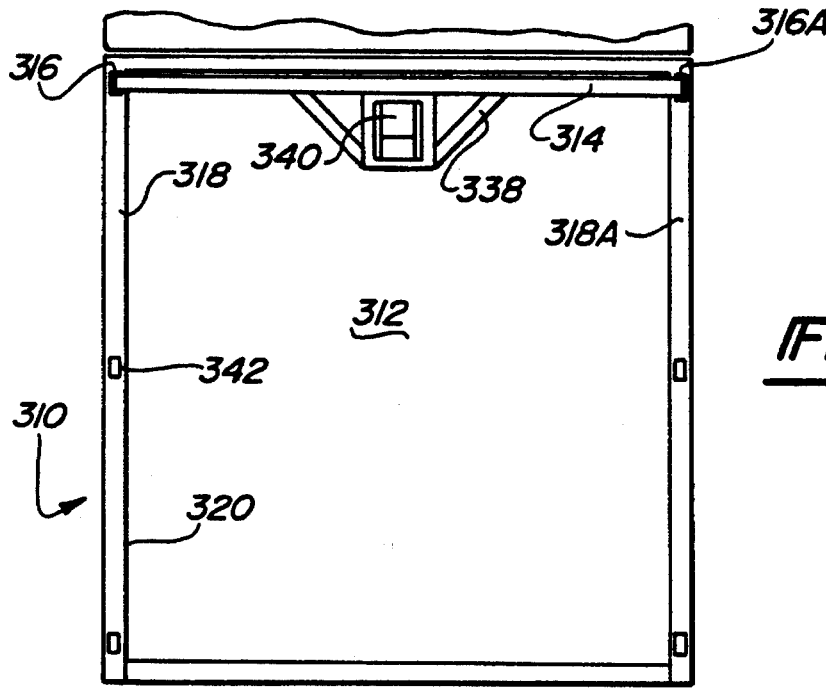
FIG. 12 is a top view of an alternative winch assembly according to the teachings of the present invention mounted to a pickup truck.
Figure 13:
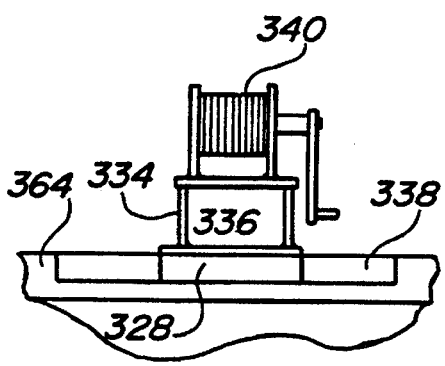
FIG. 13 is a broken away front elevational view of the winch assembly of FIG. 12.
Figure 14:
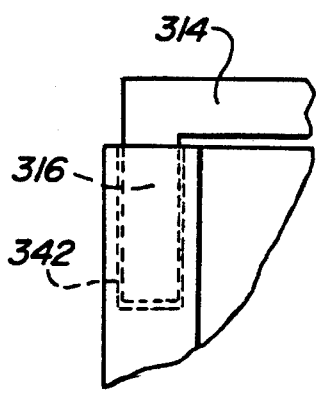
FIG. 14 is a broken away side elevational view showing the attachment of the winch assembly of FIG. 12 to the truck.

Referring to FIGS. 12, 13 and 14 an alternate preferred embodiment of a winch assembly is provided. The winch assembly 310 is shown as being attached to a pickup truck 312, although other uses are contemplated. The winch assembly 310 includes an elongated support member 314 having a pair of legs 316 and 316A extending therefrom. Preferably, the support member 314 is sufficiently long to extend from one side wall 318 to another side wall 318A of the pickup truck bed 320.

Extending from the support member 314 substantially perpendicularly to the legs 316 and 316A is a base plate 328 as described with reference to the previous disclosed embodiments. Preferably along each side of the base plate, a gusset 338 is provided which assists in maintaining the structural integrity of the winch assembly while force is exerted on the winch assembly 310. Extending substantially vertically or obliquely, depending on the needs of the user, is a stanchion 334 which preferably extends above the top edge 364 of the truck bed 320. The stanchion may be attached to the base plate 328 either by welding, adhesively or through the use of various fasteners. Integrally attached to the stanchion 334 along the upper end is a support plate 336 for hosting the winch 340. Again, any suitable commercially available winch 40 having a cable 42 or other means for drawing or moving an object over a surface can be used.

To secure the winch assembly 310 to the truck 312 the legs 316 and 316A of the support member are inserted into the pockets 342 spaced along the side walls 318 and 318A of the pickup truck bed 320. Once the legs 316 are inserted fully such that the bottom surface of the support member 314 comes to rest either directly or indirectly against the top edge 364 of the truck bed the winch assembly 310 may be operated. It may under certain circumstances be beneficial to provide a padding layer (not shown) between the support member 314 and the top edge 364 to prevent marring.

Figure 15:
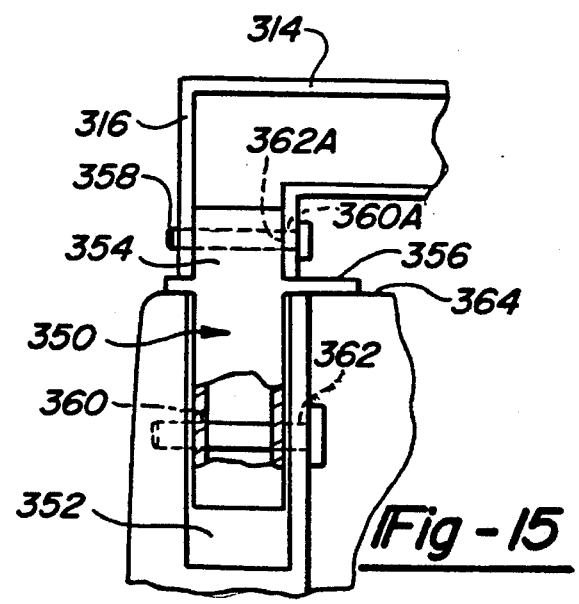
FIG. 15 is a broken away side elevational view of a coupling member used with the winch assembly of FIG. 12.

Referring to FIG. 15, optionally, instead of having a one piece elongated member 314 with extending legs 316 and 316A as shown in FIG. 12, 13 and 14 a two piece construction is provided. Under this embodiment couplings 350 having an overall t-shape which are insertable into the pockets 342 of the truck side walls 318 and 318A are provided. The couplings 350 included a base portion 352 which fits into the pocket 342 and an extending portion 354 for receiving the legs 316 and 316A of the supporting member. A transversely extending flange 356 which extends from at least one and preferably two or more sides of the coupling serves as a primary stop for the coupling 350 on the top edge 364 of the truck box. The legs 316 and 316A of the elongated member 314 shown in FIGS. 12, 13 and 14 are then inserted into or over the extending portion 354 of the coupling 350 along both side walls to support the winch assembly 310. Once attached, retaining pins 358 are utilized to maintain the couplings 350 within the pockets 342. Optionally, the legs 316 and 316A of the support member 314 can be further secured within or over the extending portion 354 of the couplings by retaining pins 358. The retaining pins 358 extend through apertures 360 provided through the coupling and through openings 62 provided along the truck bed edge 364 to secure the coupling to truck. Likewise, the retaining pins 358 extend through apertures 360A provided through the legs 316 and 316A and through the openings 362A disposed on the coupling.

Figure 16:
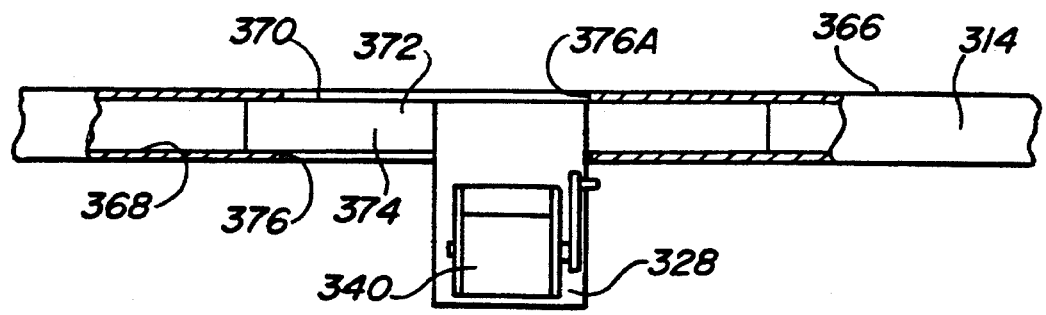
FIG. 16 is a top view partially in cross-section showing an alternative preferred embodiment according to the teachings of the present invention.
Figure 17:
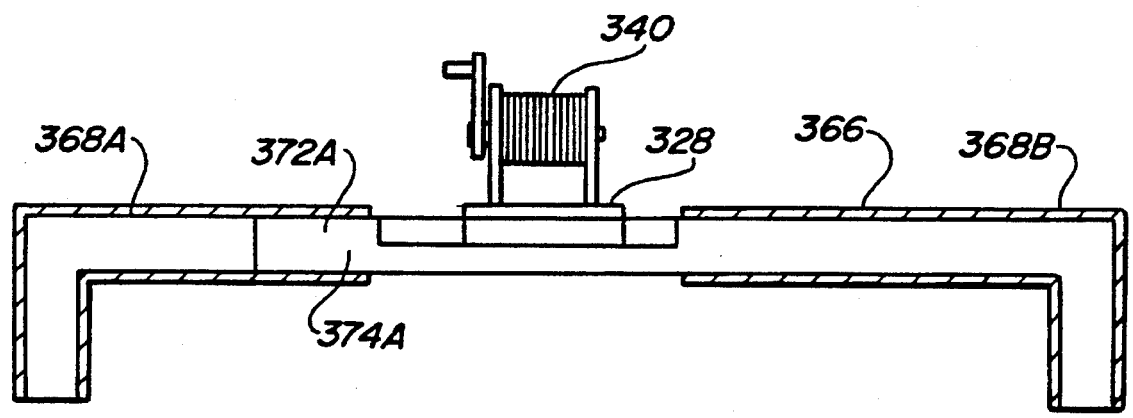
FIG. 17 is a frontal view partially in cross-section of an alternative winch assembly embodiment.

The support member 314 can be a one piece construction as shown in FIGS. 12 or may be a slip joint arrangement as shown in FIGS. 16 and 17. According to the alternative embodiment demonstrated in FIG. 16 the support member 314 includes a housing 366 in the form of a first hollow tube 368 having an elongated opening 370 disposed thereon. A shaft 372 also generally in the form of a tube 374, to which the base plate 328 is integrally attached, is disposed within the housing 366. The shaft 372 may be slid laterally within the housing to the desired location. The base plate 328 to which the winch 340 is mounted as shown in FIG. 13 serves a hilt to preclude lateral movement upon contacting either edge 376 or 376A of the opening 370. Similarly, the feature of lateral adjustability can also be accomplished by supplying a housing 366 including two L-shaped hollow first tubes 368A and 368B having a shaft 372A generally in the form of a tube 374A, extending therebetween, rather than a single tube 368 having the opening 370 through which the base plate extends.

It should be noted that while the embodiments set forth with reference to FIGS. 12 through 17 have been described as being useful with pickup trucks, the embodiments can be used for a variety of different applications wherein at least two spaced apart pockets capable of hosting the legs of couplings are provided.

While the above detailed description constitutes the preferred embodiments of the present invention, it will be appreciated that the invention is susceptible to modifications, variations and change without departing from the proper scope and fair meaning of the accompanying claims.

What is claimed is:

1. A winch assembly, comprising:

a bracket including a base plate;

a backing plate mounted to a substrate, said backing plate including fastening means for securing said bracket in a predetermined position over the substrate;

a stanchion extending upwardly from said base plate, said stanchion including means for supporting the winch in an elevated free-standing position;

a blocking plate discrete from said stanchion and extending upwardly from said base plate; and means for maintaining the stanchion in an upright position.

2. The winch assembly of claim 1, further comprising spacer means, located between said backing plate and said blocking plate, for maintaining the winch assembly away from an extending portion of the substrate.

3. The winch assembly of claim 1, wherein said means for maintaining the stanchion in an upright position includes a gusset extending between the stanchion and said base plate.

4. The winch assembly of claim 1, wherein said stanchion extends substantially perpendicularly from said base plate.

5. The winch assembly of claim 1, wherein said stanchion extends from the base plate at an oblique angle.

6. A winch assembly, comprising:

a substantially L-shaped bracket including a base plate and an upwardly extending blocking plate;

a backing plate mounted to a substrate including fastening means for securing said bracket in a predetermined position over the substrate;

a stanchion discrete from said blocking plate and extending upwardly from said base plate;

gusset means extending between said base plate and said stanchion for supporting the stanchion; and a winch mounted to said stanchion.

7. The winch assembly of claims 6, further comprising spacer means located between said backing plate and said blocking plate for spacing the winch away from the substrate.

8. The winch assembly of claim 6, wherein said stanchion extends substantially perpendicularly from said base plate.

9. The winch assembly of claim 6, wherein said stanchion extends at an oblique angle from said base plate.

* * * * *

UNITED STATES PATENT AND TRADEMARK OFFICE
CERTIFICATE OF CORRECTION

PATENT NO. : 5,509,639

DATED : April 23, 1996

INVENTOR(S) : Craig A. Ellis

It is certified that error appears in the above-indentified patent and that said Letters Patent is hereby corrected as shown below:

Col. 1, line 7, delete "a"

Col. 1, line 30, "attached" should be --attached--

Col. 2, line 50, "a" should be --an--

Col. 2, line 54, after "substrate;" delete --that of-- and insert new paragraph.

--FIG. 6 is a side elevational view of an alternative preferred winch assembly embodiment according to the teachings of the present invention;

FIG. 7 is an enlarged view of the winch assembly of FIG. 6;

FIG. 8 is a side elevational view of a winch assembly similar to--

Col. 2, line 56, "substrate." should be --substrate;--

UNITED STATES PATENT AND TRADEMARK OFFICE
CERTIFICATE OF CORRECTION

PATENT NO. : 5,509,639

DATED : April 23, 1996

INVENTOR(S) : Craig A. Ellis

It is certified that error appears in the above-indentified patent and that said Letters Patent is hereby corrected as shown below:

Col. 3, line 67, after "art" insert --that--

Col. 4, line 52, "the" should be --The--

Col. 7, line 11, "31 6A" should be --316A--

Col. 7, line 43, "FIG. 12, 13 and 14" should be --FIGS. 12, 13 and 14--

Col. 7, line 45, "t-shape" should be --T-shape--

Col. 7, line 47, "included" should be --include--

Col. 7, line 63, "62" should be --362--

Col. 8, line 2, "FIGS. 12" should be --FIG. 12--

Col. 9, line 1, Claim 7, "Claims 6" should be --Claim 6--.

Signed and Sealed this

Twelfth Day of November, 1996

Attest:

BRUCE LEHMAN

*Attesting Officer*     *Commissioner of Patents and Trademarks*